(12) United States Patent
Soh

(10) Patent No.: US 12,423,174 B2
(45) Date of Patent: Sep. 23, 2025

(54) TAG-FACILITATED TESTING FOR CLOUD INFRASTRUCTURE

(71) Applicant: Capital One Services, LLC, McLean, VA (US)

(72) Inventor: Michael Soh, Midlothian, VA (US)

(73) Assignee: Capital One Services, LLC, McLean, VA (US)

( * ) Notice: Subject to any disclaimer, the term of this patent is extended or adjusted under 35 U.S.C. 154(b) by 63 days.

(21) Appl. No.: 18/431,477

(22) Filed: Feb. 2, 2024

(65) Prior Publication Data
US 2025/0252009 A1 Aug. 7, 2025

(51) Int. Cl.
*G06F 11/00* (2006.01)
*G06F 11/07* (2006.01)

(52) U.S. Cl.
CPC ...... *G06F 11/0793* (2013.01); *G06F 11/0709* (2013.01); *G06F 11/079* (2013.01)

(58) Field of Classification Search
CPC . G06F 11/0793; G06F 11/0709; G06F 11/079
See application file for complete search history.

(56) References Cited

U.S. PATENT DOCUMENTS

| | | | |
|---|---|---|---|
| 10,671,520 B1 * | 6/2020 | Rodrigues | G06F 11/3688 |
| 2007/0162894 A1 * | 7/2007 | Noller | G06F 11/3688 717/124 |
| 2015/0331733 A1 * | 11/2015 | Channagiri | G06F 11/3688 714/33 |
| 2018/0329812 A1 * | 11/2018 | Friedenberg | G06F 11/3698 |
| 2021/0263836 A1 * | 8/2021 | Singh | G06F 11/3698 |

* cited by examiner

*Primary Examiner* — Jason B Bryan
(74) *Attorney, Agent, or Firm* — Harrity & Harrity, LLP

(57) ABSTRACT

In some implementations, a device may scan infrastructure of a cloud computing system for one or more infrastructure resources having respective tags associated with testing. The device may obtain for each infrastructure resource of the one or more infrastructure resources and based on the tags, testing information for respective infrastructure resources of the one or more resources. The device may generate, via a testing platform, experiments for respective infrastructure resources based on the testing information. The device may cause the experiments to be performed for the one or more infrastructure resources.

20 Claims, 7 Drawing Sheets

TAG-FACILITATED TESTING FOR CLOUD INFRASTRUCTURE

BACKGROUND

Cloud computing is a model for delivering computing resources over a network. Cloud computing environments allow devices to access shared pools of configurable computing resources, such as servers, storage, and applications, on-demand, without the need for direct management or ownership of the underlying infrastructure. Cloud computing environments may be associated with a variety of services, such as infrastructure-as-a-service (IaaS), platform-as-a-service (PaaS), and/or software-as-a-service (SaaS), among other examples.

SUMMARY

Some implementations described herein relate to a system for tag-facilitated chaos disruption testing. The system may include one or more memories and one or more processors communicatively coupled to the one or more memories. The one or more processors may be configured to scan infrastructure of a cloud computing system for infrastructure resources having a tag associated with chaos disruption testing, wherein the tag includes a key indicating the chaos disruption testing. The one or more processors may be configured to identify, based on scanning the infrastructure, one or more infrastructure resources having the tag. The one or more processors may be configured to obtain, for each infrastructure resource of the one or more infrastructure resources and based on the tag, testing information for respective infrastructure resources of the one or more resources. The one or more processors may be configured to wherein the tag includes a value indicating the testing information for that infrastructure resource. The one or more processors may be configured to generate, via a chaos platform and based on the testing information, chaos experiments for respective infrastructure resources of the one or more infrastructure resources. The one or more processors may be configured to cause the chaos experiments to be performed for the one or more infrastructure resources.

Some implementations described herein relate to a method of tag-facilitated testing. The method may include scanning, by a device, infrastructure of a cloud computing system for one or more infrastructure resources having respective tags associated with testing. The method may include obtaining, by the device, for each infrastructure resource of the one or more infrastructure resources and based on the tags, testing information for respective infrastructure resources of the one or more resources. The method may include generating, by the device and via a testing platform, experiments for respective infrastructure resources based on the testing information. The method may include causing, by the device, the experiments to be performed for the one or more infrastructure resources.

Some implementations described herein relate to a non-transitory computer-readable medium that stores a set of instructions. The set of instructions, when executed by one or more processors of a device, may cause the device to search infrastructure of a cloud computing system for one or more infrastructure resources having respective tags associated with chaos disruption testing. The set of instructions, when executed by one or more processors of the device, may cause the device to obtain, based on the tags, testing information for respective infrastructure resources of the one or more resources. The set of instructions, when executed by one or more processors of the device, may cause the device to generate, via a chaos platform, chaos experiments for respective infrastructure resources based on the testing information. The set of instructions, when executed by one or more processors of the device, may cause the device to cause the chaos experiments to be performed for the one or more infrastructure resources.

DETAILED DESCRIPTION

Figure 1A:
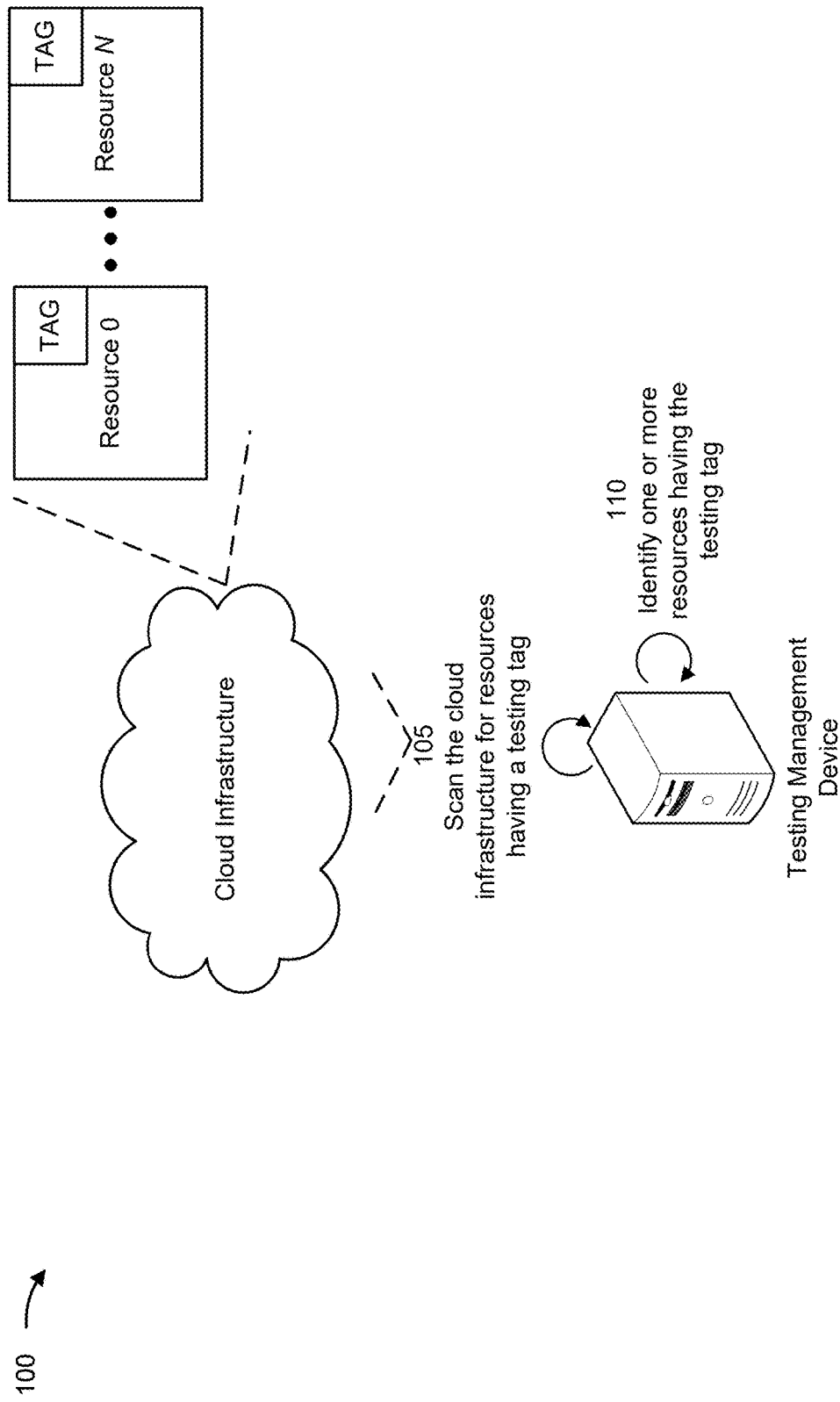
FIGS. 1A-1D are diagrams of an example associated with tag-facilitated testing for a cloud infrastructure, in accordance with some embodiments of the present disclosure.

The following detailed description of example implementations refers to the accompanying drawings. The same reference numbers in different drawings may identify the same or similar elements.

A cloud computing provider may provide a set of cloud computing services to an entity (e.g., a company, an organization, or an institution) via a cloud computing environment. The cloud computing environment may be associated with an infrastructure. The infrastructure may include infrastructure resources (e.g., cloud computing resources) that execute or perform actions via the cloud computing environment. For example, an infrastructure resource may include an application, a virtual machine, a storage component (e.g., an object storage component, a block storage component, or a file storage component), a networking component (e.g., a virtual network, a subnet, or a load balancer), a database component, a computing component (e.g., a serverless function (such as a Lambda function), or a container), an identity and access management (IAM) component, a monitoring and logging component (e.g., a cloud monitoring component), a security component (e.g., a network security group, or an encryption management component), a high availability and disaster recovery component (e.g., multi-region deployments), and/or a hybrid cloud integration component (e.g., configured to connect with on-premises infrastructure), among other examples.

In some examples, testing of infrastructure resources may be performed. For example, testing the infrastructure resources may ensure that the cloud environment is robust, performs well under various conditions, and/or meets standards for security and compliance, among other examples. The testing may include resilience and fault tolerance testing (e.g., chaos (or disruption) testing, fault injection testing, or disaster recovery testing), functional testing, performance testing, security testing, scalability and elasticity testing, data management testing, and/or hybrid cloud testing, among other examples. By using a comprehensive testing strategy, potential issues may be identified and mitigated early in the development and deployment lifecycle, ensuring the reliability and performance of the infrastructure resources of the cloud computing environment.

However, establishing and maintaining testing operation(s) for infrastructure resources may be complex. For example, cloud environments are inherently dynamic and distributed, making it difficult to predict and control the variables that can impact testing operations. Additionally, accurately and efficiently establishing or generating testing operations requires a deep understanding of the cloud architecture, intricate knowledge of dependencies between services, and/or an ability to orchestrate controlled testing between the infrastructure resources and testing platform(s). Further, the cloud environment may include multiple interconnected services and microservices, each with dedicated or unique characteristics and testing modes. Coordinating testing across this complex landscape presents challenges related to data consistency, service discovery, and/or distributed systems resilience, among other examples.

For example, when an infrastructure resource is re-deployed (e.g., after being previously deployed), values associated with the infrastructure resource may change. For example, an identifier or other information associated with the infrastructure resource may be different for different deployment instances of the infrastructure resource. As a result, a testing operation established for a first deployment instance may not be suitable for use for a second deployment instance of the infrastructure resource (e.g., because values, such as an identifier, may be different in the first deployment instance and the second deployment instance). As a result, the testing operation may be deleted, re-generated, and re-deployed for the second deployment instance (e.g., to ensure that the testing operation is suitable for the current deployment instance). This may consume significant time, processing resources, computing resources, memory resources, and/or network resources, among other examples, associated with generating and deploying testing operations for each deployment instance of an infrastructure resource. Additionally, it may be difficult to detect if any information, values, or states of the cloud environment have changed during a deployment instance for an infrastructure resource that may cause a testing operation to be inefficient or unsuitable for that deployment instance (e.g., for testing operations that are manually generated for the deployment instance). As a result, a device or platform may attempt to perform the testing operation for the deployment instance, consuming processing resources, computing resources, memory resources, and/or network resources, among other examples, performing the testing operation that is inefficient or unsuitable for that deployment instance.

Some implementations described herein enable tag-facilitated testing for a cloud infrastructure. For example, an infrastructure resource may include a testing tag (e.g., as metadata of the infrastructure resource) that indicates testing information for the infrastructure resource. By including the testing tag, the infrastructure resources are encoded with the testing information indicating a type of test to be performed, parameters for the test, and/or conditions for the test, among other examples. This may enable a testing operation to be established and/or deployed at, or near, a time the testing operation is to be performed.

For example, a testing management device may scan the infrastructure of a cloud computing system for infrastructure resources having a tag associated with testing, such as chaos disruption testing. The tag may include a key indicating a type of testing to be performed for the infrastructure resource. The testing management device may identify, based on scanning the infrastructure, one or more infrastructure resources having the tag. The testing management device may obtain, for each infrastructure resource of the one or more infrastructure resources and based on the tag, testing information for respective infrastructure resources of the one or more resources. For example, the tag may include a value indicating the testing information for that infrastructure resource. The testing management device may generate, via a testing platform and based on the testing information, testing experiments for respective infrastructure resources of the one or more infrastructure resources. The testing management device may cause the testing experiments to be performed for the one or more infrastructure resources.

In some implementations, the testing management device may obtain, based on identifying the one or more infrastructure resources using the tag, identifying information associated with the one or more infrastructure resources. The testing management device may generate, using the identifying information, targets (e.g., testing targets) for the respective infrastructure resources. In other words, based on information associated with the infrastructure resource(s) at the time the tag is detected, the testing management device may determine a testing target for each infrastructure resource. The testing management device may transmit, to the testing platform, an indication of the targets to cause the testing platform to generate the testing experiments for the targets.

As a result, the testing management device may be enabled to automatically generate the testing experiments for an infrastructure resource using testing information encoded for the infrastructure resource via a testing tag. For example, the testing management device may use current information for a deployment instance of the infrastructure resource when generating the testing experiment (e.g., testing operation) because the testing tag enables the testing management device to identify the infrastructure resource(s) to be tested and to identify testing information for respective infrastructure resources. As a result, the testing management device may be enabled to generate testing experiments on-demand and/or at (or near) a time of testing to increase the likelihood that the information used to generate the testing experiments is accurate. This may conserve time, processing resources, computing resources, memory resources, and/or network resources, among other examples, that would have otherwise been associated with generating and deploying testing operations for each deployment instance of an infrastructure resource. Further, by encoding the testing tag (e.g., a metadata) for an infrastructure resource, a centralized device or service (e.g., the testing management device) may be enabled to identify any infrastructure resources to be tested in a given cloud infrastructure or environment, thereby enabling the centralized device or service to generate testing experiments for all of the infrastructure resources to be tested. This may conserve time, processing resources, computing resources, memory resources, and/or network resources, among other examples, that would have otherwise been associated with separately generating and/or deploying testing experiments for each infrastructure resource.

Additionally, by encoding the testing information via the testing tag(s), the testing management device may be enabled to identify up to date information for the infrastructure resource when generating the testing experiment(s). This may conserve processing resources, computing resources, memory resources, and/or network resources, among other examples, that would have otherwise been used generating and/or performing testing experiments that are inefficient or unsuitable for a deployment instance of an infrastructure resource. Further, by the testing management device determining testing targets and/or other parameters for testing experiments using identifying information (or deployment information) of infrastructure resources that include the testing tag, the testing management device may automatically generate testing experiments using up-to-date and relevant information for current deployment instances of the infrastructure resources, thereby increasing the likelihood that the generated testing experiments are relevant and/or suitable for the infrastructure resources.

FIGS. 1A-1D are diagrams of an example 100 associated with tag-facilitated testing for a cloud infrastructure. As shown in FIGS. 1A-1D, example 100 includes a testing management device, a cloud infrastructure, and a testing platform. These devices are described in more detail in connection with FIGS. 2 and 3.

Some examples may be described herein in connection with chaos disruption testing. Chaos disruption testing may also be referred to as chaos engineering, fault injection testing, failure injection testing, resilience testing, stress testing, disaster recovery testing, turmoil testing, anomaly testing, and/or disruption testing, among other examples. It should be understood that the techniques and implementations described herein may be similarly applied to other types of cloud infrastructure resources testing and are not limited to chaos disruption testing. For example, the techniques and implementations described herein may be similarly applied to functional testing, performance testing, security testing, scalability and elasticity testing, data management testing, and/or hybrid cloud testing, among other examples.

As shown in FIG. 1A, the cloud infrastructure (e.g., a cloud environment) may include multiple infrastructure resources deployed using resources of the cloud infrastructure, shown as Resource 0 through Resource N in FIG. 1A. As used herein, an "infrastructure resource" refers to a component deployed using resources of the cloud infrastructure. For example, an infrastructure resource may include an application, a virtual machine, a storage component (e.g., an object storage component, a block storage component, or a file storage component), a networking component (e.g., a virtual network, a subnet, or a load balancer), a database component, a computing component (e.g., a serverless function (such as a Lambda function), or a container), an IAM component, a monitoring and logging component (e.g., a cloud monitoring component), a security component (e.g., a network security group, or an encryption management component), a high availability and disaster recovery component (e.g., multi-region deployments), and/or a hybrid cloud integration component (e.g., configured to connect with on-premises infrastructure), among other examples.

An infrastructure resource may be encoded with one or more resource tags. A "resource tag" refers to a metadata label that can be assigned to an infrastructure resource. A resource tag may be a key-value pair that provides additional information about the infrastructure resource. The key may be a unique identifier for the resource tag. The value may provide information or context related to the key.

In some implementations, a resource tag may include a testing tag. A testing tag may be a resource tag that is associated with testing for an infrastructure resource. For example, the testing tag may include a key that identifies testing and/or a type of testing. As an example, the key may identify chaos disruption testing. This enables the testing management device to search or scan for infrastructure resources deployed in the cloud infrastructure that are to be tested, as described in more detail elsewhere herein. For example, the key may be a participation tag indicating that an infrastructure resource is to participate in a given type of testing (e.g., where the type of testing is indicated by the key).

The value of the testing tag may indicate testing information. For example, the value may include one or more fields separated by a delimiter, such as a colon. The one or more fields may correspond to respective parameters or information included in the testing information. For example, the value may include an experiment code (or event code) identifying a type of testing experiment to be performed, a duration parameter (e.g., indicating a duration of the testing experiment), an error quantity parameter (e.g., for chaos disruption testing indicating a quantity of errors to be injected for the testing experiment), a test type parameter (e.g., indicating a type of test to be performed), a timing parameter (e.g., indicating a time and/or date at which the testing experiment is to be performed and/or a periodicity at which the testing experiment is to be performed or repeated), an experiment parameter field (e.g., for indicating one or more experiment parameters), and/or an execution group parameter, among other examples. As an example, the value may include an event code (e.g., indicating a testing event in which the testing experiment for the infrastructure resource is to be performed), an execution group (e.g., indicating testing execution priority during the testing event), and an experiment parameter field (e.g., indicating one or more testing parameters for the testing experiment).

As shown by reference number 105, the testing management device may scan the cloud infrastructure for resources (e.g., infrastructure resources) having a testing tag. For example, the testing management device may search for infrastructure resources that include a resource tag having a key (or a name) indicating that testing is to be performed or indicating a given type of testing, such as chaos disruption testing. For example, the testing management device may submit an application programming interface (API) call or a command-line query that includes the key (or name) of the testing tag to be searched for. The cloud infrastructure may return a list of infrastructure resources (e.g., shown as Resource 0 through Resource N in FIG. 1A) that includes the testing tag having the key (or name) that is searched for.

In some implementations, the testing management device may periodically search for (or scan the cloud infrastructure for) infrastructure resources that include a testing tag having a given key. For example, the testing management device may search for infrastructure resources daily, weekly, monthly, quarterly, or at a different periodicity. Additionally, or alternatively, the testing management device may search for (or scan the cloud infrastructure for) infrastructure resources that include a testing tag having a given key based on detecting a search event. The search event may be an event that triggers the search or scan for the infrastructure resources. As an example, the search event may include an amount of time until a testing event (or a time at which testing is to occur) satisfying a search threshold. For example, if a testing event is to occur soon, then the testing management device may search for all infrastructure resources to be tested during the testing event. As another example, the search event may be associated with one or more conditions of the cloud infrastructure. For example, if a load of the cloud infrastructure satisfies a load threshold (e.g., if there is a low load on the cloud infrastructure), then the testing management device may search for all infrastructure resources to be tested while there is a low load.

As shown by reference number 110, the testing management device may identify one or more resources (e.g., infrastructure resources). For example, from the returned list of infrastructure resources, the testing management device may identify the one or more infrastructure resources that include the testing tag. Additionally, the testing management device may identify the one or more infrastructure resources that include the testing tag having a given key (e.g., that is associated with a type of testing for which the testing management device is generating testing experiments). In some implementations, the testing management device may identify, from the returned list of infrastructure resources, one or more infrastructure resources for which a testing experiment or a testing operation has not yet been established, generated, or deployed. For example, the testing management device may identify infrastructure resources that include a testing tag and that have not yet had a testing experiment or testing operation established, generated, or deployed for those infrastructure resources. For example, the testing management device may communicate with the testing platform (not shown in FIG. 1A) to determine whether the testing platform has testing experiments for the list of infrastructure resources.

Figure 1B:
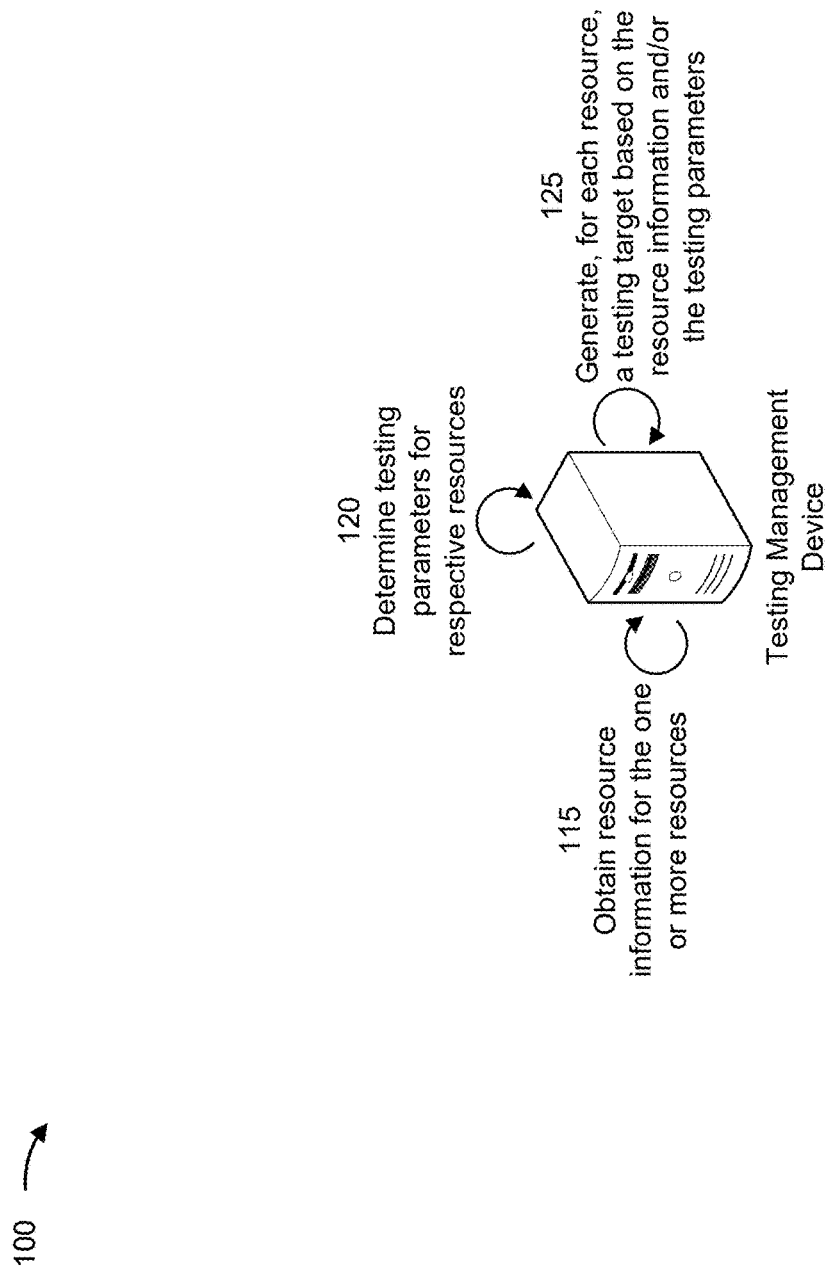

As shown in FIG. 1B, and by reference number 115, the testing management device may obtain resource information for one or more resources (e.g., the one or more resources described elsewhere herein). The resource information may include identifying information (e.g., one or more unique identifiers, such as an instance identifier), a resource configuration (e.g., a size, type, and/or settings of the resource configuration), one or more other resource tags, status and health information (e.g., indicating a current status of the infrastructure resource), deployment information (e.g., indicating when the infrastructure resource was created or modified), networking information, performance information (e.g., performance metrics (such as processing utilization or memory usage) or load balancer information), billing and/or cost information (e.g., indicating information related to resource usage and any associated costs), logging information (e.g., indicating logs and events related to a lifecycle of the infrastructure resources), and/or security information (e.g., indicating one or more security groups, one or more security rules, and/or access control information), among other examples. The testing management device may obtain resource information for a given infrastructure resource based on identifying that the given infrastructure resource includes a testing tag (e.g., having a given key).

As shown by reference number 120, the testing management device may determine test parameters for respective infrastructure resources included in the one or more infrastructure resources. The testing management device may determine, for each infrastructure resources, one or more testing parameters. The testing management device may determine the one or more testing parameters based on the testing tag encoded for a given infrastructure resource. For example, the testing management device may determine a value indicated by the testing tag encoded for a given infrastructure resource. The value may indicate the one or more testing parameters.

For example, the value may include a testing type field indicating a type of test or experiment to be performed. As an example, for chaos disruption testing, the type of test or experiment to be performed may include an availability zone disruption experiment, a server error experiment (e.g., a 5xx error), a failure injection experiment, and/or a dependency testing experiment, among other examples. Additionally, the value may include or indicate an execution group parameter. The execution group parameter may indicate a priority of the infrastructure resource in connection with the testing to be performed. For example, the testing may be performed via the testing platform in connection with multiple infrastructure resources. Some infrastructure resources may have different execution priorities for the testing. For example, infrastructure resources may have different execution priorities because the testing is to be performed in a different manner or over a different duration than testing for other infrastructure resources. Therefore, performing the testing in accordance with execution groups may increase the efficiency and conserve resources (e.g., processing resources or network resources) associated with performing the testing. For example, performing the testing in accordance with execution groups may increase a likelihood that tests that are executed similarly or using similar conditions or parameters are executed together.

As another example, the value may indicate one or more experiment parameters. For example, a field in the value of the testing tag may indicate the one or more experiment parameters. The one or more experiment parameters may be associated with (or specific to) the type of testing indicated by the key or by another field of the value of the testing tag. For example, for a server error experiment (e.g., a 5xx error experiment), the value may indicate one or more experiment parameters, such as a duration (e.g., in seconds or milliseconds), and/or a quantity of errors to be injected (e.g., a quantity of errors per second to be injected), among other examples. As another examples, for an availability zone disruption experiment, the value may indicate one or more experiment parameters, such as a duration (e.g., in seconds or milliseconds), one or more availability zones to be disrupted, and/or a randomization parameter (e.g., indicating whether an availability zone or subnet to be disrupted is to be selected randomly), among other examples.

As another example, the value may indicate a timing parameter indicating a timing of the testing to be performed. For example, the timing parameter may indicate a date and/or time at which the testing is to be performed. As another example, the timing parameter may indicate a testing event during which the testing is to be performed (e.g., where the testing event is to occur at a given date and/or time). Additionally, or alternatively, the timing parameter may indicate whether the testing is to be repeated and/or periodically performed. In some implementations, the timing parameter may indicate a periodicity and/or frequency at which the testing is to be performed. In some implementations, the value may include a field indicating whether the infrastructure resource is opted in to testing (e.g., if testing is to be performed for the infrastructure resource for each testing event) or if the test is to be performed in a one-time manner (e.g., if only a single testing experiment is to be performed).

In some implementations, the testing management device may determine, for each infrastructure resource of the one or more infrastructure resources, the one or more testing parameters based on the resource information for that infrastructure resource. For example, the testing tag may indicate that testing is to be performed and/or may indicate a testing type or a given test to be performed. The testing management device may obtain the resource information for each infrastructure resource (e.g., as described in connection with reference number 115). The testing management device may determine the one or more testing parameters based on the obtained resource information.

For example, the testing management device may determine optimized testing parameters using the resource information. As an example, the testing management device may determine an execution group or an execution priority for an infrastructure resource based on resource information for that infrastructure resource. For example, the testing management device may determine the execution group for an infrastructure resource based on the name of the infrastructure resource, an identifier of the infrastructure resource, and/or other metadata associated with the infrastructure resources. In some implementations, the testing management device may determine the execution group based on other testing parameters for that infrastructure resource, such as a duration of testing to be performed.

As another example, the testing management device may determine a duration, a quantity of errors, and/or a type of testing, among other examples, to be performed based on the resource information. For example, based on a resource type of the infrastructure resource, the testing management device may determine the duration and/or the quantity of errors to be associated with a testing experiment for the infrastructure resource. For example, different resource types may be tested differently. Therefore, the testing management device may determine testing parameter(s) for the infrastructure resource based on the resource type.

As another example, the testing management device may determine a timing of the testing based on the resource information. For example, the testing management device may identify one or more periods of time during which traffic or a load for a given infrastructure resource is typically low. The testing management device may determine the timing of the testing to cause a testing experiment to occur during one or more of the periods of time during which traffic or a load for a given infrastructure resource is typically low (e.g., so as to reduce a user impact caused by the testing experiment).

As shown by reference number 125, the testing management device may generate, for each infrastructure resource, a testing target based on the resource information and/or the testing parameters. A "testing target" refers to an infrastructure resource and associated testing parameters for that infrastructure resource. For example, a testing target may include resource information for a given infrastructure resource and associated testing parameters for the given infrastructure resource packaged or compiled in a manner that is readable and/or accessible by the testing platform. For example, the organization and/or format of the testing target may be based on the testing platform being used to perform the testing experiments. This ensures that the testing platform is able to obtain and/or understand the resource information for a given infrastructure resource and associated testing parameters for the given infrastructure resource associated with the testing target.

Figure 1C:
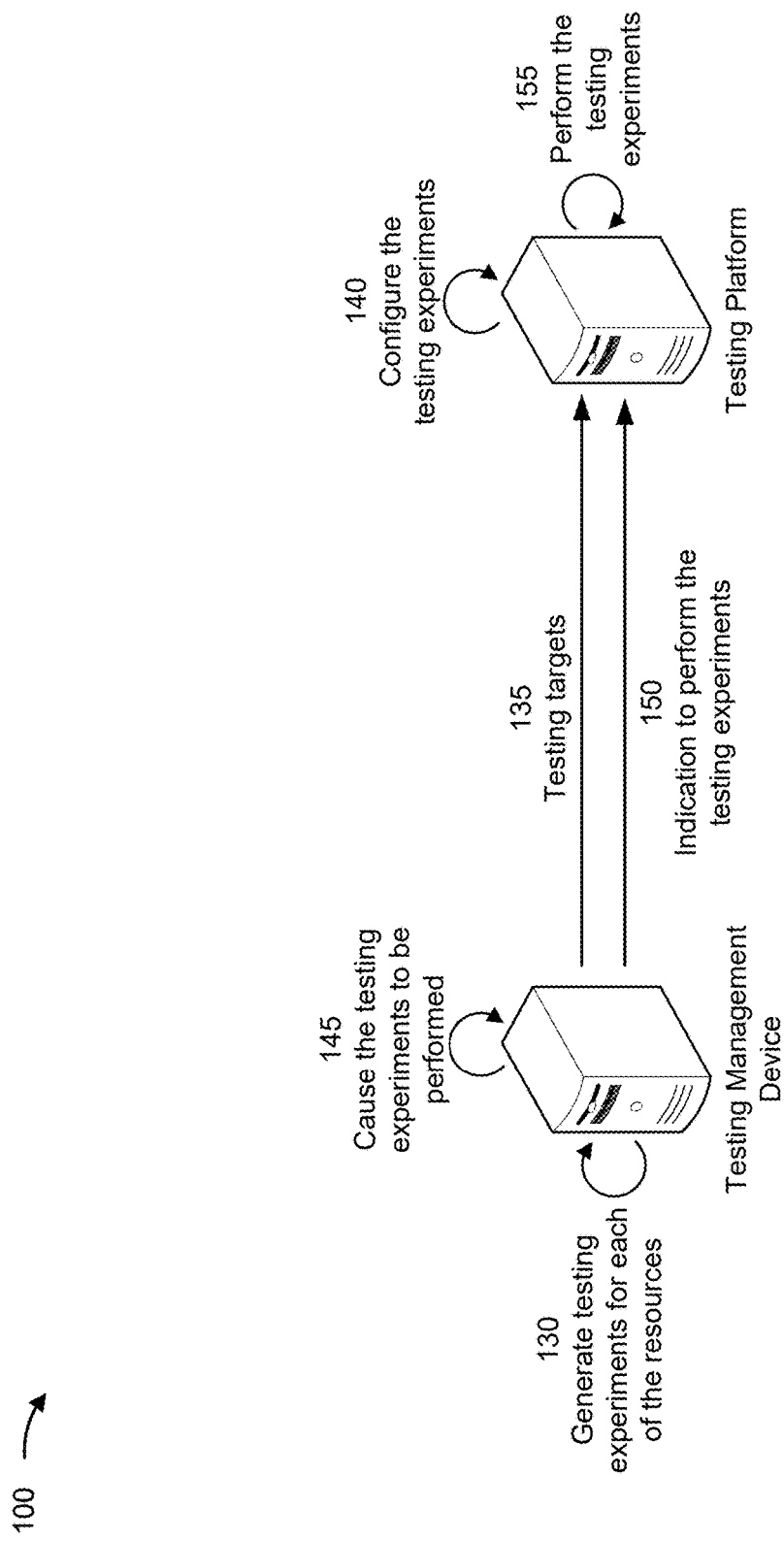

As shown in FIG. 1C, and by reference number 130, the testing management device may generate testing experiments for each of the infrastructure resources. For example, the testing management device may generate, via the testing platform and based on the testing information (e.g., indicated by the testing tags), testing experiments for respective infrastructure resources of the one or more infrastructure resources. In some implementations, the testing experiments may be chaos experiments.

For example, as shown by reference number 135, to generate the testing experiments, the testing management device may transmit, to the testing platform, an indication of the testing targets (e.g., to cause the testing experiments to be generated by the testing platform). For example, the testing management device may transmit, and the testing platform may receive, an indication of resource information and testing parameters for each infrastructure resource of the one or more infrastructure resources (e.g., via one or more API calls). As shown by reference number 140, the testing platform may configure the testing experiments using the testing targets provided by the testing management device. For example, the testing platform may configure a testing experiment for each infrastructure resource in accordance with the testing target for that infrastructure resource.

In some implementations, the testing platform may transmit, and the testing management device may receive, an indication that the testing experiments have been generated or established. The testing management device may obtain confirmation(s) that the testing experiments have been generated correctly. For example, the testing management device may transmit, to one or more client devices, information associated with the testing experiments (e.g., to enable users to analyze the testing experiment generated for a given infrastructure resource). The testing management device may obtain, from the one or more client devices, an indication of whether the testing experiments are confirmed or denied for each infrastructure resource. Additionally, or alternatively, the testing management device may compare, for a given infrastructure resource, the information associated with a testing experiment for the given infrastructure resource to testing parameters for the given infrastructure resource (e.g., to determine whether the testing experiment was generated in a manner that follows the testing parameters).

As shown by reference number 145, the testing management device may cause the testing experiments to be performed. In some implementations, the testing management device may cause the testing experiments to be performed in accordance with one or more execution groups. For example, the testing management device may group, for each infrastructure resource of the one or more infrastructure resources, that infrastructure resource into one or more execution groups (e.g., as determined by the testing management device and/or as indicated by the execution group parameter indicated by the tag for that infrastructure resource).

As shown by reference number 150, the testing management device may transmit, and the testing platform may receive, an indication to perform the testing experiments. For example, the testing management device may transmit, and the testing platform may receive, an indication of an execution group for which testing experiments are to be performed. For example, an indication of an execution group may include a list of infrastructure resources included in the execution group.

As shown by reference number 155, the testing platform may perform the testing experiments. For example, the testing platform may perform testing experiments for the infrastructure resources indicated by the testing management device (e.g., as described in connection with reference number 150). In some implementations, the testing platform may perform one or more chaos experiments (e.g., in examples where the testing platform is a chaos platform). For example, the testing platform may execute the testing experiments by intentionally introducing faults, such as network outages, service unavailability, and/or resource constraints, into targeted components or services within the infrastructure resources.

The testing platform may obtain test results based on performing the testing experiments. For example, the testing platform may monitor a real-time response by the infrastructure resources to the injected faults. For example, the testing platform may assess how the infrastructure resource detects, mitigates, and/or recovers from the disruptions injected as part of the testing experiments. The testing platform may collect test results, such as error rates, and/or recovery times during and after the fault injection, among other examples.

Figure 1D:
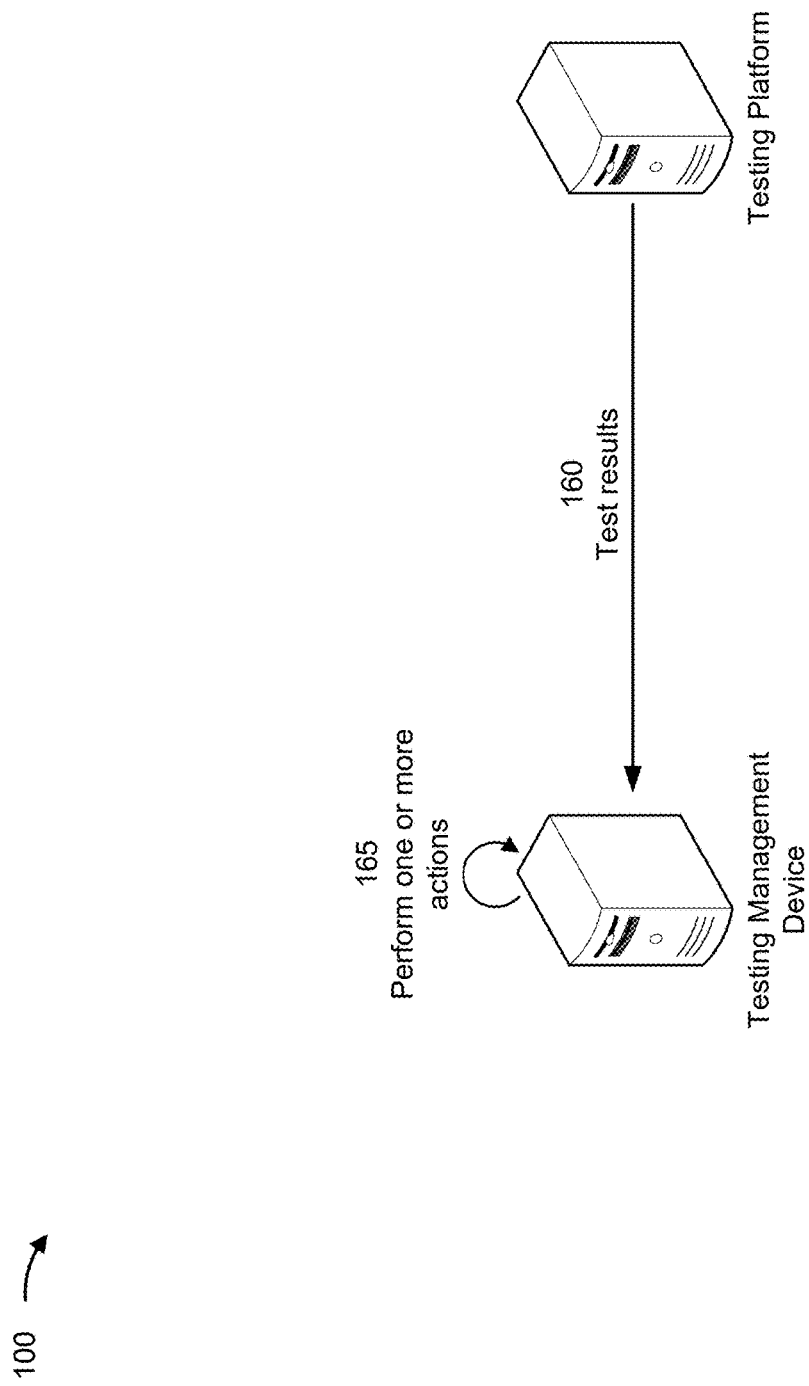

As shown in FIG. 1D, and by reference number 160, the testing platform may transmit, and the testing management device may receive, the test results. For example, the testing management device may obtain, via the testing platform, test results for the respective infrastructure resources. As shown by reference number 165, the testing management device may perform, for at least one infrastructure resource of the one or more infrastructure resources, a corrective action based on the test results indicating that at least one infrastructure resource failed one or more of the chaos experiments.

For example, if the test results indicate that a testing experiment has failed for an infrastructure resource (e.g., if a quantity of errors does not satisfy an error threshold or if a recovery time does not satisfy a recovery threshold), then the testing management device may perform one or more actions to address the failure. In some implementations, the testing management device may transmit, and a client device may receive, an indication of the failure to enable a user to take corrective action to address the failure. In some implementations, the testing management device may perform an action associated with a deployment of the infrastructure resource. For example, the testing management device may take the infrastructure resource offline, limit a load handled by the infrastructure resource, and/or reduce resource bandwidth available to the infrastructure resource, among other examples. This may reduce a negative effect of failures for real-word traffic or operations (e.g., outside of the testing scenario).

In some implementations, the testing management device may remove, after a completion of the testing experiments, the testing tags from the one or more infrastructure resources. For example, the testing tags may be dynamically removed from an infrastructure resource after a completion of a testing experiment for the infrastructure resource. For example, the testing tag may indicate that testing is to be performed only once for the infrastructure resource. In such examples, the testing management device may remove the testing tag from the infrastructure after a completion of the testing experiment to ensure that additional testing experiments are not performed for the infrastructure resource (e.g., reducing a likelihood of unexpected testing causing interruptions for operations performed via the infrastructure resource). In other examples, the testing tag may indicate that testing is to be repeated and/or performed periodically. In such examples, the testing management device may refrain from removing the testing tag from the infrastructure resource (e.g., conserving resources that would have otherwise been associated with recreating or re-generating the testing tag for future testing).

As indicated above, FIGS. 1A-1D are provided as an example. Other examples may differ from what is described with regard to FIGS. 1A-1D.

Figure 2:
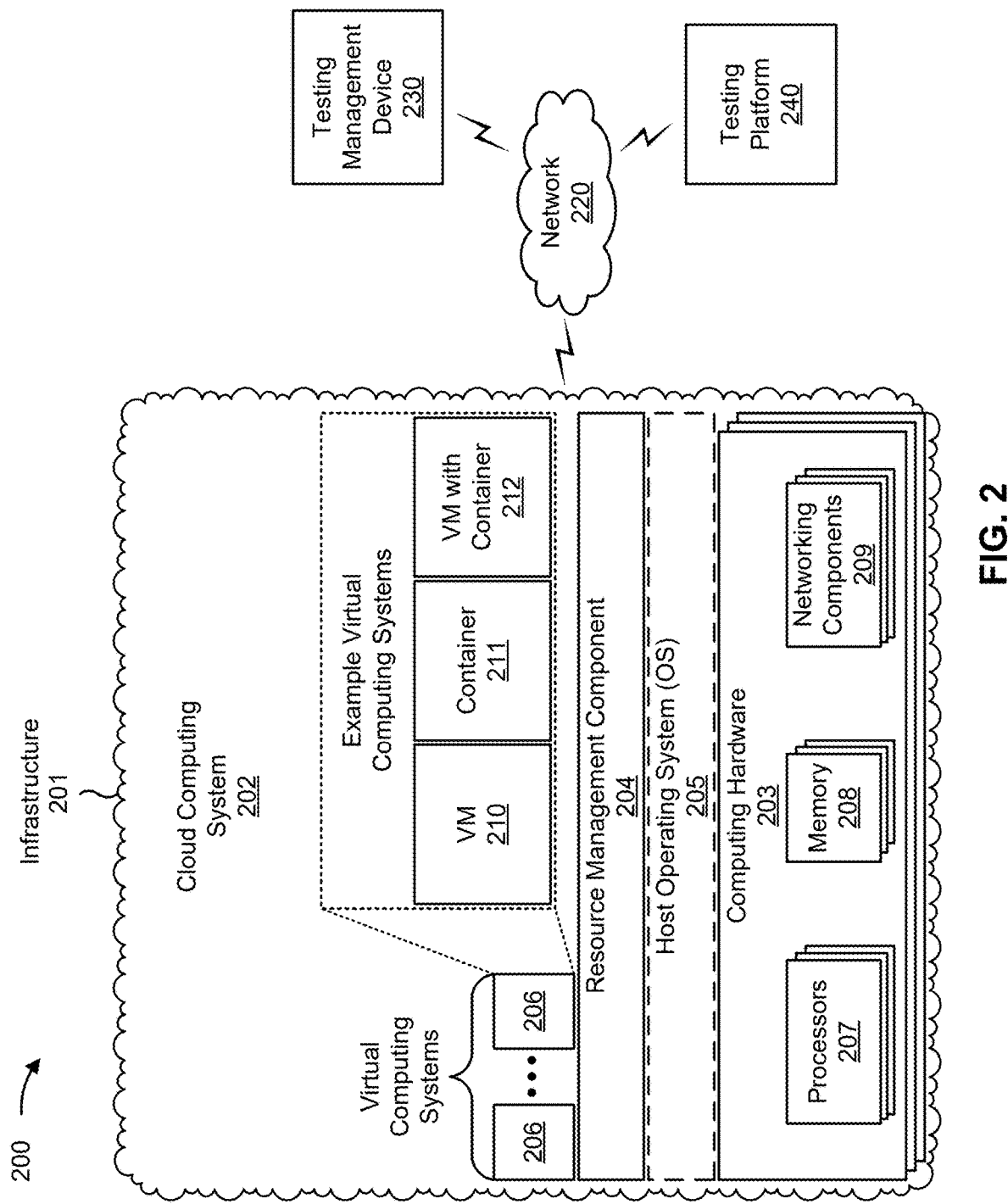
FIG. 2 is a diagram of an example environment in which systems and/or methods described herein may be implemented, in accordance with some embodiments of the present disclosure.

FIG. 2 is a diagram of an example environment 200 in which systems and/or methods described herein may be implemented. As shown in FIG. 2, environment 200 may include an infrastructure 201, which may include one or more elements of and/or may execute within a cloud computing system 202. The cloud computing system 202 may include one or more elements 203-212, as described in more detail below. As further shown in FIG. 2, environment 200 may include a network 220, a testing management device 230, and/or a testing platform 240. Devices and/or elements of environment 200 may interconnect via wired connections and/or wireless connections.

The cloud computing system 202 may include computing hardware 203, a resource management component 204, a host operating system (OS) 205, and/or one or more virtual computing systems 206. The cloud computing system 202 may execute on, for example, an AMAZON WEB SERVICES platform, a MICROSOFT AZURE platform, or a SNOWFLAKE platform. The resource management component 204 may perform virtualization (e.g., abstraction) of computing hardware 203 to create the one or more virtual computing systems 206. Using virtualization, the resource management component 204 enables a single computing device (e.g., a computer or a server) to operate like multiple computing devices, such as by creating multiple isolated virtual computing systems 206 from computing hardware 203 of the single computing device. In this way, computing hardware 203 can operate more efficiently, with lower power consumption, higher reliability, higher availability, higher utilization, greater flexibility, and lower cost than using separate computing devices.

The computing hardware 203 may include hardware and corresponding resources from one or more computing devices. For example, computing hardware 203 may include hardware from a single computing device (e.g., a single server) or from multiple computing devices (e.g., multiple servers), such as multiple computing devices in one or more data centers. As shown, computing hardware 203 may include one or more processors 207, one or more memories 208, and/or one or more networking components 209. Examples of a processor, a memory, and a networking component (e.g., a communication component) are described elsewhere herein.

The resource management component 204 may include a virtualization application (e.g., executing on hardware, such as computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, or another type of hypervisor) or a virtual machine monitor, such as when the virtual computing systems 206 are virtual machines 210. Additionally, or alternatively, the resource management component 204 may include a container manager, such as when the virtual computing systems 206 are containers 211. In some implementations, the resource management component 204 executes within and/or in coordination with a host operating system 205.

A virtual computing system 206 may include a virtual environment that enables cloud-based execution of operations and/or processes described herein using computing hardware 203. As shown, a virtual computing system 206 may include a virtual machine 210, a container 211, or a hybrid environment 212 that includes a virtual machine and a container, among other examples. A virtual computing system 206 may execute one or more applications using a file system that includes binary files, software libraries, and/or other resources required to execute applications on a guest operating system (e.g., within the virtual computing system 206) or the host operating system 205.

Although the infrastructure 201 may include one or more elements 203-212 of the cloud computing system 202, may execute within the cloud computing system 202, and/or may be hosted within the cloud computing system 202, in some implementations, the infrastructure 201 may not be cloud-based (e.g., may be implemented outside of a cloud computing system) or may be partially cloud-based. For example, the infrastructure 201 may include one or more devices that are not part of the cloud computing system 202, such as device 300 of FIG. 3, which may include a standalone server or another type of computing device. The infrastructure 201 may perform one or more operations and/or processes described in more detail elsewhere herein.

The network 220 may include one or more wired and/or wireless networks. For example, the network 220 may include a cellular network, a public land mobile network (PLMN), a local area network (LAN), a wide area network (WAN), a private network, the Internet, and/or a combination of these or other types of networks. The network 220 enables communication among the devices of the environment 200.

The testing management device 230 may include one or more devices capable of receiving, generating, storing, processing, providing, and/or routing information associated with tag-facilitated testing for cloud infrastructure (e.g., the infrastructure 201), as described elsewhere herein. The testing management device 230 may include a communication device and/or a computing device. For example, the testing management device 230 may include a server, such as an application server, a client server, a web server, a database server, a host server, a proxy server, a virtual server (e.g., executing on computing hardware), or a server in a cloud computing system. In some implementations, the testing management device 230 may include computing hardware used in a cloud computing environment, such as the infrastructure 201 and/or the cloud computing system 202.

The testing platform 240 may include one or more devices capable of receiving, generating, storing, processing, providing, and/or routing information associated with tag-facilitated testing for cloud infrastructure (e.g., the infrastructure 201), as described elsewhere herein. The testing platform 240 may be configured to manage, initiate, configure, and/or analyze one or more tests for components or resources included in the infrastructure 201. The testing platform 240 may include a communication device and/or a computing device. For example, the testing platform 240 may include a server, such as an application server, a client server, a web server, a database server, a host server, a proxy server, a virtual server (e.g., executing on computing hardware), or a server in a cloud computing system. In some implementations, the testing platform 240 may include computing hardware used in a cloud computing environment, such as the infrastructure 201 and/or the cloud computing system 202.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
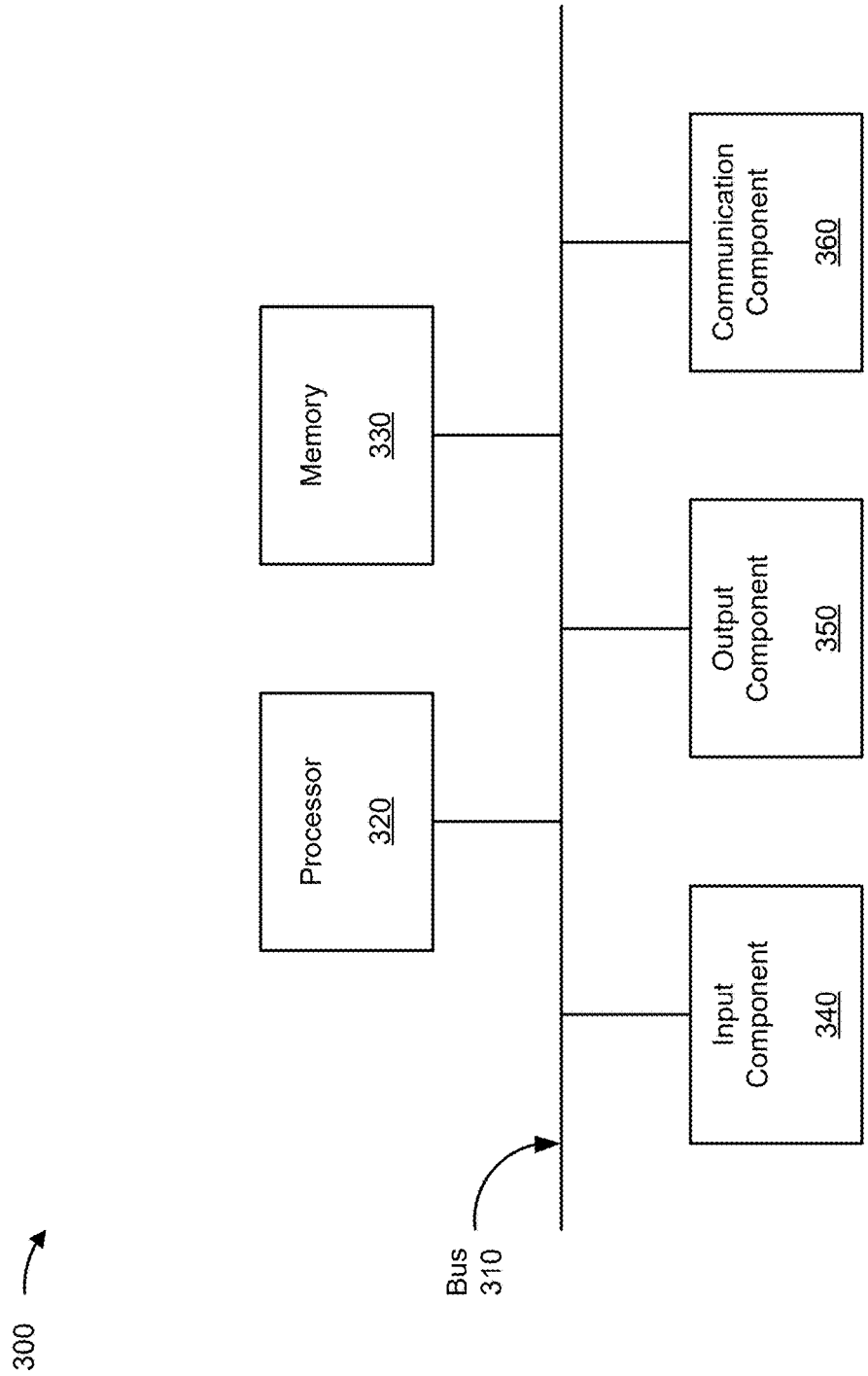
FIG. 3 is a diagram of example components of a device associated with tag-facilitated testing for cloud infrastructure, in accordance with some embodiments of the present disclosure.

FIG. 3 is a diagram of example components of a device 300 associated with tag-facilitated testing for cloud infrastructure. The device 300 may correspond to the infrastructure 201 (e.g., and/or a component of the infrastructure 201), the testing management device 230, and/or the testing platform 240. In some implementations, the infrastructure 201 (e.g., and/or a component of the infrastructure 201), the testing management device 230, and/or the testing platform 240 may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
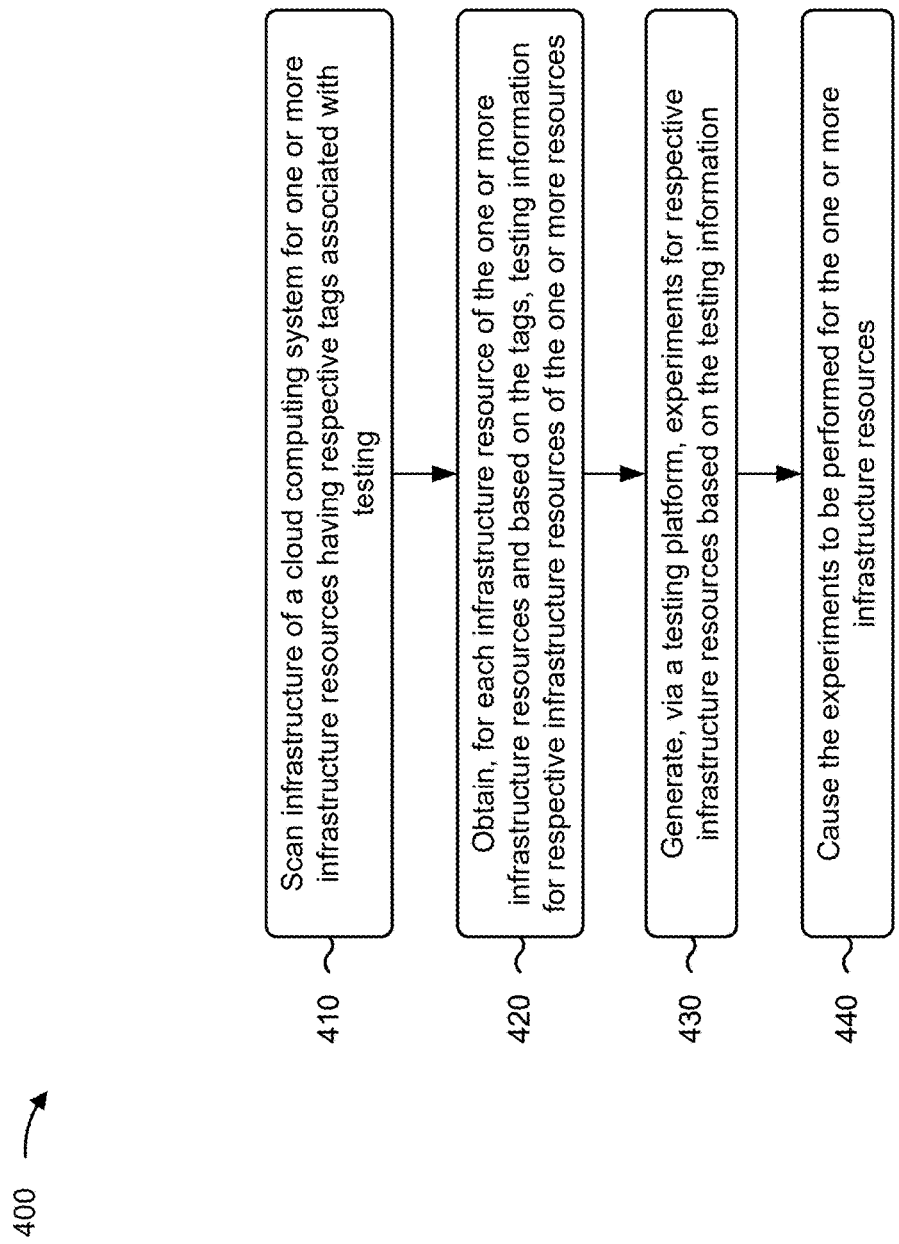
FIG. 4 is a flowchart of an example process associated with tag-facilitated testing for a cloud infrastructure, in accordance with some embodiments of the present disclosure.

FIG. 4 is a flowchart of an example process 400 associated with tag-facilitated testing for a cloud infrastructure. In some implementations, one or more process blocks of FIG. 4 may be performed by the testing management device 230. In some implementations, one or more process blocks of FIG. 4 may be performed by another device or a group of devices separate from or including the testing management device 230, such as the infrastructure 201, the cloud computing system 202 (and/or a component of the cloud computing system 202), and/or the testing platform 240. Additionally, or alternatively, one or more process blocks of FIG. 4 may be performed by one or more components of the device 300, such as processor 320, memory 330, input component 340, output component 350, and/or communication component 360.

As shown in FIG. 4, process 400 may include scanning infrastructure of a cloud computing system for one or more infrastructure resources having respective tags associated with testing (block 410). For example, the testing management device 230 (e.g., using processor 320 and/or memory 330) may scan infrastructure of a cloud computing system for one or more infrastructure resources having respective tags associated with testing, as described above in connection with reference number 105 of FIG. 1A. As an example, the testing management device 230 may search for infrastructure resources having a tag (e.g., a testing tag) that includes a given key indicating a type of testing, such as chaos disruption testing.

As further shown in FIG. 4, process 400 may include obtaining for each infrastructure resource of the one or more infrastructure resources and based on the tags, testing information for respective infrastructure resources of the one or more resources (block 420). For example, the testing management device 230 (e.g., using processor 320 and/or memory 330) may obtain for each infrastructure resource of the one or more infrastructure resources and based on the tags, testing information for respective infrastructure resources of the one or more resources, as described above in connection with reference number 115 and/or reference number 120 of FIG. 1B. As an example, the testing management device may obtain testing parameters for testing experiments to be performed for respective infrastructure resources. In some implementations, the testing parameters may be indicated by the tag (e.g., the testing tag) and/or may be determined by the testing management device 230. For example, for a chaos disruption test (e.g., a chaos experiment), the testing information may include a type of test, an execution group, and/or one or more testing parameters (e.g., a test duration, a quantity of errors to be introduced, or another testing parameter).

As further shown in FIG. 4, process 400 may include generating, via a testing platform, experiments for respective infrastructure resources based on the testing information (block 430). For example, the testing management device 230 (e.g., using processor 320 and/or memory 330) may generate, via a testing platform, experiments for respective infrastructure resources based on the testing information, as described above in connection with reference number 125 of FIG. 1B and/or reference number 130 of FIG. 1C. As an example, the testing management device 230 may generate testing targets for each infrastructure resource using the testing information for that infrastructure resource.

As further shown in FIG. 4, process 400 may include causing the experiments to be performed for the one or more infrastructure resources (block 440). For example, the testing management device 230 (e.g., using processor 320 and/or memory 330) may cause the experiments to be performed for the one or more infrastructure resources, as described above in connection with reference number 145 of FIG. 1C. As an example, the testing management device may transmit, to a testing platform (e.g., a chaos platform) an indication of testing targets for respective infrastructure resources. This may enable the testing platform to generate and/or perform the experiments, as described herein.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel. The process 400 is an example of one process that may be performed by one or more devices described herein. These one or more devices may perform one or more other processes based on operations described herein, such as the operations described in connection with FIGS. 1A-1D. Moreover, while the process 400 has been described in relation to the devices and components of the preceding figures, the process 400 can be performed using alternative, additional, or fewer devices and/or components. Thus, the process 400 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for tag-facilitated chaos disruption testing, the system comprising:
   one or more memories; and
   one or more processors, coupled to the one or more memories, configured to:
   scan infrastructure of a cloud computing system for infrastructure resources having a tag associated with chaos disruption testing,
   wherein the tag includes a key indicating the chaos disruption testing;
   identify, based on scanning the infrastructure, one or more infrastructure resources having the tag;
   obtain, for each infrastructure resource of the one or more infrastructure resources and based on the tag, testing information for respective infrastructure resources of the one or more infrastructure resources;
   wherein the tag includes a value indicating the testing information for that infrastructure resource;
   generate, via a chaos platform and based on the testing information, chaos experiments for respective infrastructure resources of the one or more infrastructure resources; and
   cause the chaos experiments to be performed for the one or more infrastructure resources.

2. The system of claim 1,
   wherein the one or more processors are further configured to:
   obtain, via the chaos platform, test results for the respective infrastructure resources; and
   perform, for at least one infrastructure resource of the one or more infrastructure resources, a corrective action based on the test results indicating that the at least one infrastructure resource failed one or more of the chaos experiments.

3. The system of claim 1,
   wherein the one or more processors, to generate the chaos experiments, are configured to:
   obtain, based on identifying the one or more infrastructure resources using the tag, identifying information associated with the one or more infrastructure resources;
   generate, using the identifying information, targets for the respective infrastructure resources; and
   transmit, to the chaos platform, an indication of the targets, to cause the chaos experiments to be generated.

4. The system of claim 1,
   wherein the tag includes a timing parameter indicating a timing of the chaos disruption testing to be performed.

5. The system of claim 1,
   wherein the tag includes an execution group parameter indicating a priority of the chaos disruption testing to be performed.

6. The system of claim 5,
   wherein the one or more processors, to cause the chaos experiments to be performed, are configured to:
   group, for each infrastructure resource of the one or more infrastructure resources, that infrastructure resource into one or more execution groups as indicated by the execution group parameter; and
   cause the chaos experiments to be performed in accordance with the one or more execution groups.

7. The system of claim 1,
wherein the testing information includes one or more testing parameters, and wherein the one or more processors, to obtain the testing information, are configured to:
obtain, for each infrastructure resource of the one or more infrastructure resources, resource information for that infrastructure resource based on that infrastructure resource including the tag; and
determine, for each infrastructure resource of the one or more infrastructure resources, the one or more testing parameters based on the resource information for that infrastructure resource.

8. The system of claim 7,
wherein the one or more testing parameters include at least one of:
an execution group,
a test duration,
a quantity of errors, or
a test type.

9. The system of claim 1,
wherein the value includes at least one of:
an experiment code identifying a type of chaos experiment to be performed,
a duration parameter, or
an error quantity parameter.

10. A method of tag-facilitated testing, comprising:
scanning, by a device, infrastructure of a cloud computing system for one or more infrastructure resources having respective tags associated with testing;
obtaining, by the device, for each infrastructure resource of the one or more infrastructure resources and based on the respective tags, testing information for respective infrastructure resources of the one or more infrastructure resources;
generating, by the device and via a testing platform, experiments for the respective infrastructure resources based on the testing information; and
causing, by the device, the experiments to be performed for the one or more infrastructure resources.

11. The method of claim 10, further comprising:
removing, after a completion of the experiments, the respective tags from the one or more infrastructure resources.

12. The method of claim 10,
wherein generating the experiments comprises:
obtaining, based on identifying the one or more infrastructure resources using the respective tags, identifying information associated with the one or more infrastructure resources; and
generating, using the identifying information, targets for the respective infrastructure resources.

13. The method of claim 10,
wherein the respective tags include indications of execution priorities for the testing.

14. The method of claim 10,
wherein the testing information includes one or more testing parameters, and wherein obtaining the testing information comprises:
obtaining infrastructure information for the one or more infrastructure resources; and
determining the one or more testing parameters based on the infrastructure information.

15. The method of claim 10,
wherein each respective tag, of the respective tags, indicates at least one of:
an experiment code identifying a type of experiment to be performed,
a duration parameter, or
an error quantity parameter.

16. The method of claim 10,
wherein the experiments include at least one of:
an availability zone disruption experiment,
a server error experiment,
a failure injection experiment, or
a dependency testing experiment.

17. A non-transitory computer-readable medium storing a set of instructions, the set of instructions comprising:
one or more instructions that, when executed by one or more processors of a device, cause the device to:
search infrastructure of a cloud computing system for one or more infrastructure resources having respective tags associated with chaos disruption testing;
obtain, based on the respective tags, testing information for respective infrastructure resources of the one or more infrastructure resources;
generate, via a chaos platform, chaos experiments for respective infrastructure resources based on the testing information; and
cause the chaos experiments to be performed for the one or more infrastructure resources.

18. The non-transitory computer-readable medium of claim 17,
wherein the one or more instructions further cause the device to:
obtain, via the chaos platform, test results for the respective infrastructure resources; and
perform, for at least one infrastructure resource of the one or more infrastructure resources, an action based on the test results.

19. The non-transitory computer-readable medium of claim 17,
wherein the one or more instructions, that cause the device to generate the chaos experiments, cause the device to:
obtain, based on identifying the one or more infrastructure resources using the respective tags, identifying information associated with the one or more infrastructure resources; and
generate, using the identifying information, targets for the respective infrastructure resources.

20. The non-transitory computer-readable medium of claim 17,
wherein the testing information includes one or more testing parameters, and wherein the one or more processors, to obtain the testing information, are configured to:
obtain, for each infrastructure resource of the one or more infrastructure resources, infrastructure information for that infrastructure resource; and
determine, for each infrastructure resource of the one or more infrastructure resources, the one or more testing parameters based on the infrastructure information for that infrastructure resource.

* * * * *